United States Patent
Wyld et al.

(10) Patent No.: US 10,134,187 B2
(45) Date of Patent: Nov. 20, 2018

(54) AUGMENTED REALITY WITH GRAPHICS RENDERING CONTROLLED BY MOBILE DEVICE POSITION

(71) Applicant: Somo Innovations Ltd., London (GB)

(72) Inventors: Andrew Wyld, London (GB); Dave Evans, Stroud (GB)

(73) Assignee: Somo Innvoations Ltd., London (GB)

( * ) Notice: Subject to any disclaimer, the term of this patent is extended or adjusted under 35 U.S.C. 154(b) by 362 days.

(21) Appl. No.: 14/821,588

(22) Filed: Aug. 7, 2015

(65) Prior Publication Data

US 2016/0042569 A1 Feb. 11, 2016

Related U.S. Application Data

(60) Provisional application No. 62/034,661, filed on Aug. 7, 2014.

(51) Int. Cl.
| | |
|---|---|
| *G06T 15/00* | (2011.01) |
| *G06T 19/00* | (2011.01) |
| *G06K 9/46* | (2006.01) |
| *G06K 9/52* | (2006.01) |

(52) U.S. Cl.
CPC .......... *G06T 19/006* (2013.01); *G06K 9/4604* (2013.01); *G06K 9/52* (2013.01)

(58) Field of Classification Search
None
See application file for complete search history.

(56) References Cited

U.S. PATENT DOCUMENTS

| 8,379,057 B2 | 2/2013 | Mann et al. |
| 2007/0035561 A1 | 2/2007 | Bachelder et al. |
| 2008/0088624 A1 | 4/2008 | Long et al. |
| 2009/0051699 A1 | 2/2009 | Posa et al. |
| 2012/0182313 A1 | 7/2012 | Ahn et al. |
| 2012/0190455 A1 | 7/2012 | Briggs |
| 2012/0256911 A1* | 10/2012 | Nakamura ............ G06T 15/04 345/419 |
| 2012/0299817 A1 | 11/2012 | Atkins et al. |
| 2013/0083252 A1 | 4/2013 | Boyes |
| 2013/0265333 A1 | 10/2013 | Ainsworth et al. |
| 2014/0152869 A1* | 6/2014 | Solotko ................. G06Q 10/10 348/231.3 |
| 2015/0070389 A1* | 3/2015 | Goto ........................ G06T 7/00 345/633 |

* cited by examiner

*Primary Examiner* — Andrew G Yang
(74) *Attorney, Agent, or Firm* — Kilpatrick Townsend & Stockton LLP

(57) ABSTRACT

Systems and methods are provided for rendering graphics in augmented reality software based on the movement of a device in relation to a target object, in order to produce more desired rendering effects. An augmented reality graphic can be both scaled and shifted laterally compared to the target based on a position of the device, and can then be cropped to match the target. Scaling and shifting related to movement parallel to the target can be performed using a first (parallel) function, and scaling and shifting related to movement toward and away from the target can be performed using a second (perpendicular) function. Both functions can be chosen to ensure that an edge of the augmented image is not passed over so as to provide blank space.

20 Claims, 8 Drawing Sheets

AUGMENTED REALITY WITH GRAPHICS RENDERING CONTROLLED BY MOBILE DEVICE POSITION

CROSS-REFERENCES TO RELATED APPLICATIONS

This application is a non-provisional application of and claims the benefit of the filing date of U.S. Provisional Application No. 62/034,661, filed on Aug. 7, 2014, which is herein incorporated by reference in its entirety for all purposes.

FIELD

The present disclosure relates to systems and methods involving graphics rendering, and more specifically to updating graphics rendered over a video feed based on a position of a device (e.g., a device with a rear-facing camera and screen).

BACKGROUND

Devices can overlay graphics onto a video feed to provide augmented reality. Such augmented reality can provide instructional information, such as directions. One application is to replace part of a video feed, e.g., a billboard within the video feed. However, difficulties can arise when the overlaid graphics are to be depicted in a particular way, e.g., portrayed as if a structure in the real world (of which a video is being taken) acts like a window. Embodiments can address these and other problems.

SUMMARY

Embodiments of the present invention provide systems and methods for rendering graphics in augmented reality software. An augmented graphic can be partially rendered on the user's device screen over a target object in a live video feed. In various embodiments, the augmented graphic can be both scaled and shifted laterally compared to the target based on a position of the device. The augmented graphic can then be cropped to match the target. The lateral motion of the device parallel to the target and perpendicular distance from the target can be determined in various ways, e.g., from measurements using input from the device's camera or from sensors (e.g., GPS or accelerometer) in the device.

In one embodiment, the scaling and shifting related to movement parallel to the target can be performed using a first (parallel) function. The parallel function can ensure that an edge of the augmented image is not passed over so as to provide blank space. The parallel function can be chosen such that it is linear at the origin, and then increases asymptotically to a constant positive value for high positive input values, and to a constant negative one for high negative input values. This parallel function can be used to relate the lateral shift of the augmentation to the lateral motion of the device relative to the target.

In another embodiment, the scaling and shifting related to movement toward and away from (perpendicular to) the target can be performed using a second (perpendicular) function. The perpendicular function can ensure that the augmented graphic still appears to be viewed through the target object, thereby providing a parallax effect. The perpendicular function can be chosen to behave like an inverse function (e.g., 1/z and variations thereof), but is bounded above by a positive value as the input value becomes close to zero. This function can be used to determine the scale of the augmentation based on the camera's distance from the target.

Other embodiments are directed to systems, portable consumer devices, and computer readable media associated with methods described herein.

A better understanding of the nature and advantages of embodiments of the present invention may be gained with reference to the following detailed description and the accompanying drawings.

DETAILED DESCRIPTION

Embodiments of the present invention provide systems and methods for rendering graphics based on the position and/or movement of a device in relation to a target object. In various embodiments, the position of a device in relation to the target object is used as the input of two mathematical functions, the output of which determine the rendering of graphics on the device. These mathematical functions may take on different specific forms in different embodiments, but can follow certain criteria in order to produce desired rendering effects.

I. Introduction

Augmented reality software, operated by a user's device (e.g., a mobile device), overlays static or dynamic images and objects on the device's graphic display of the field of view captured by the device's camera when it is sensed that the camera is pointed at a target object. A purpose of doing this may be to create the illusion that they are using their device to peer into a "window" which may display any number of things that aren't actually present in physical reality.

Figure 5:
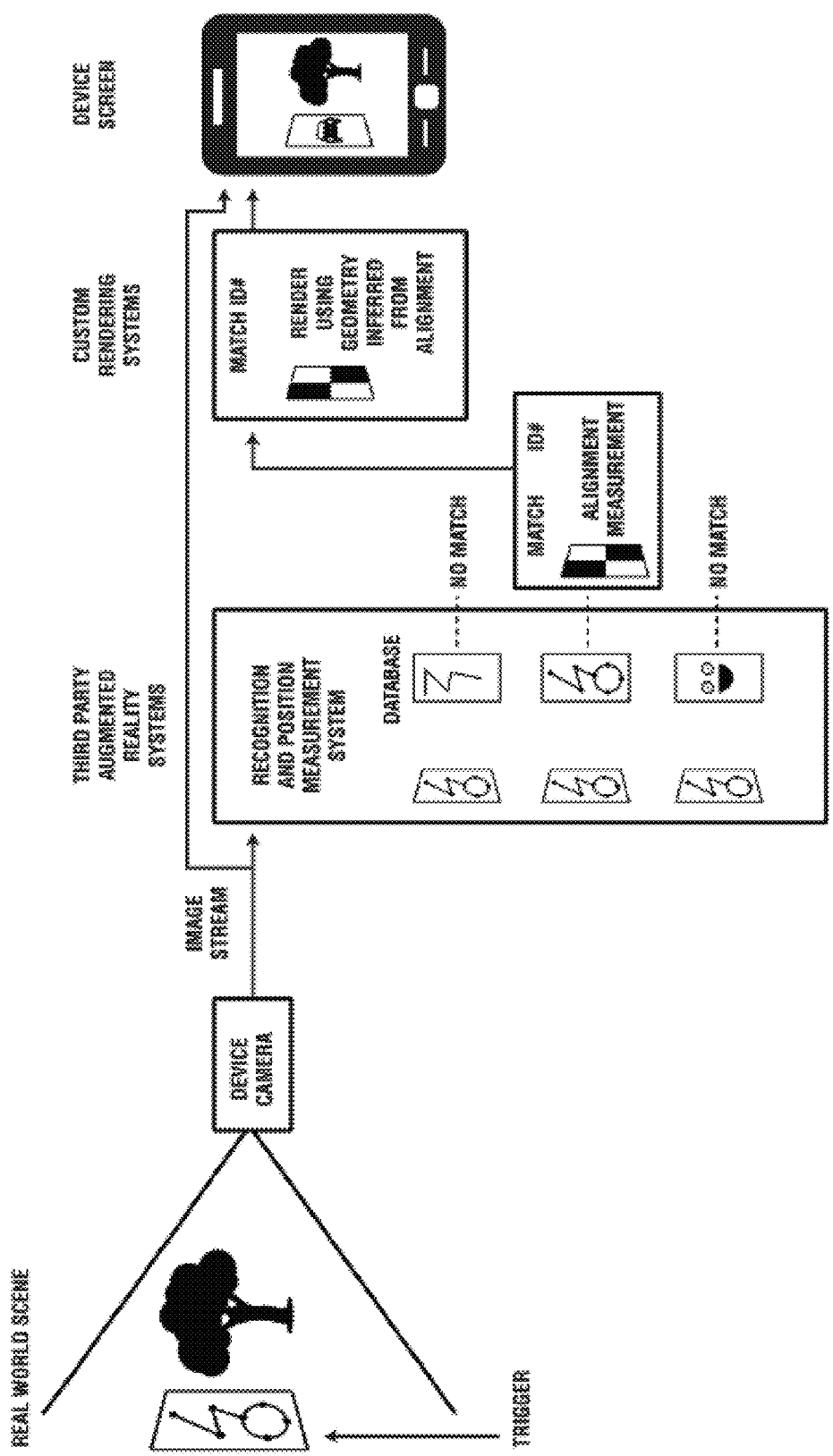
FIG. 5 shows a block diagram of an example image matching system usable with system and methods according to embodiments of the present invention.

This may be done when a user moves a device, such as a mobile phone or tablet, with the device's camera turned on, displaying the camera's field of view. The user's device may include a logic layer that analyzes the camera's field of view. The field of view can be compared to a database of images or objects (known as "targets" or "triggers") to determine if any of these are present in it; alternatively the scene itself can be tracked directly by looking for features within it that can be tracked directly. The field of study devoted to techniques of this type is called Computer Vision, and a wide variety of techniques exist for analyzing a scene, any of which may be applied in this context. In both cases, the device essentially performs matching of a scene against either pre-defined objects or against measurements of the scene itself. The match determination can be performed at the device itself or at a server in communication with the device. A match does not require 100% similarity, but rather may be based on an abstraction of the target image or object to be detected—for example, the database may contain a pattern of points in a target image, and matching consists of determining if the same pattern is present in the field of view. FIG. 5 shows an example image matching system usable with embodiments of the present invention.

If a match is found, the alignment of the detected image (target) relative to the field of view can then be determined, e.g., whether the field of view is perpendicular to a face of the target object, or at an angle. Since the device is in the user's hand, the field of view is very unlikely to be parallel to the image, so that the image will be skewed, rotated and foreshortened in the field of view. Based on the determined alignment, an image, video or object (collectively referred to as a graphic) is displayed on the device's screen such that it appears to align perfectly with the detected image in the real world (known as an "augmentation"). Sometimes an augmentation image is placed directly over a target image, so that it effectively replaces it in the scene.

As the user moves the device, the targets can be tracked so that the augmentations will shift, skew, scale, move and otherwise change in ways that are realistic with relation to the movement of the device. Tracking may often be performed even if only part of a target is detected, or if the target moves out of the detected scene.

An example application of this technology is as follows: a print brochure contains an image of a cat, and a digital abstraction of this image has been loaded into a database as a target. When the user's device's camera passes over the print image, it is matched to the target image in the database, and a digital image (graphic) of a lion is displayed on the device's screen, such that the graphic is overlaid on top of the image of the cat that has been detected and matched by the device. The user's screen then displays everything in the field of view of the camera (for instance, the page of the print brochure and the table it's on), but the image of the cat is not displayed, and in the location where it would be on screen, the image of the lion is shown instead. As the user moves the device around, the orientation of the picture of the cat is detected, and the augmented image of the lion is distorted in realistic ways to match the picture of the cat.

Another example is as follows: a print brochure contains an image of the interior of a room with a single, plate glass window. A digital abstraction of the image of the room and the window has been loaded into a database as a target. When the user's device passes over the print image, again, it is matched to the target image in the database, and a picture of the view through the window is overlaid on to the scene so that the user has the illusion of seeing through the window. Again, the user's screen displays everything in the field of view of the camera, but the print image of the window is replaced with the augmentation showing the view. This time, however, as the user moves the device around, the position of the camera relative to the window is used to display different portions of the view, to give the illusion that the user is looking through the window and seeing the outside world beyond. Thus, a parallax shift can be used to display different part of a virtual outside world based on the device's position relative to the target window.

The illusion of the augmented image moving realistically in response to the movement of the device may fail in this second example, however, when the device is positioned either very obliquely or very close to the brochure. In either case, because an augmented image is finite in nature, one or more of the boundaries of the augmented image may become visible to the user. It would be like looking through a window at a movie backdrop: if one got too close to the window, or looked round the sides, one could see the edge of the backdrop. Similarly, because the image of the view from the room is selected based on the camera position, but the image cannot be infinite in extent, at wide enough angles the edge would be visible.

It is therefore desirable to provide techniques that will allow the augmentation—the view through the window—to be displayed in such a way that the augmentation will be shifted and scaled realistically for relatively small viewing angles and at larger distances, but will gradually be shifted and scaled less and less for wider angles and smaller distances, so that the edge of the augmented image may never be seen.

II. Compensating for Movement

In order to create the illusion that the device's perspective of an augmented image is changing realistically with respect to the motion and position of the device, certain embodiments of the present invention can perform in the following manner.

In one embodiment, the user's device camera analyzes the scene that the camera is pointed at and compares it with a database of physically descriptive information about objects and images that may be in the scene. If a match is found between an object or image in the scene and its description in the database, an graphic such as an image or movie (hereinafter referred to as the "augmentation") associated with the matched object or image (hereinafter referred to as the "target object") is identified in the database, and the alignment of target object is determined. This alignment and relative position of the device determine the location at which the augmentation will be shown. The database does not need to contain the complete images, or complete models of 3D objects, to track them (although this can be done). The database just needs some kind of physical information about the tracked objects so that the tracking system knows enough to "recognize" relevant objects and images when they appear in the field of view.

Once the target object is detected, a shape (e.g., rectangle or other polygon) is aligned to the target that will serve as the border for the augmentation (hereinafter referred to as the "border"). In some embodiments, the augmentation is larger than the area defined by the border. In this case, the augmentation will be cropped such that only the portion of the augmentation that lies within the border is shown. The portion of the augmentation that is shown is herein referred to as the "displayed portion". The displayed portion is a subsection of the augmentation, and can be described by a certain position (within the augmentation) and size. The size of the displayed portion can be measured in units or described as a unit-less quantity. For example, the size can be written as a unit-less ratio (e.g., what proportion of the augmentation is included in the displayed portion). Such a ratio can be within a range of 0 to 1, or within a range of some small positive minimum (e.g., 0.02) and 1. There can be a continuous identification and measurement of the border as the device moves to identify two sets of information, described below.

One set of information collected is the perpendicular distance from the plane of the border (or the plane of the target object) to the device; this produces a single distance value (hereinafter referred to as the "z-distance"). In one embodiment, the z-distance is always a positive value, as the space behind the border is not of interest.

Another set of information collected is the displacement from the center of the border (or the center of the target object) to the device in the directions parallel to the plane of the border; this produces two displacement values (hereinafter referred to as the "lateral displacement" or the "lateral offset vector"), one in the horizontal direction (hereinafter referred to as the "x-displacement") and one in the vertical direction (hereinafter referred to as the "y-displacement"). Note that the x-displacement and y-displacement can be negative or positive. Conventionally, x-displacement is negative left of the center and positive right of it; y-displacement is negative beneath the center and positive above it. Embodiments do not require this convention to be adhered to. In this description this convention is assumed, without loss of generality.

These two sets of collected data (which are two components of device position) can be used to determine a measure that is directly related to viewing angle, by dividing the lateral displacement by the z-distance. The x-displacement divided by the z-distance is hereinafter referred to as the "relative x-displacement". The y-displacement divided by the z-distance is hereinafter referred to as the "relative y-displacement". Both of these values collectively are hereinafter referred to as the "relative lateral displacement". In one aspect, the "relative" measurements correspond to a gradient of the device's line of sight through a virtual window, and are values that embodiments can use when calculating shift. From these data, it can be determined what to display within the border.

For augmented images and movies, certain embodiments of the present invention can use augmentation images that are larger in width and height than the border in which they will be framed when displayed on the user's device. As the device moves parallel to the plane of the border, the relative lateral displacement changes and different parts of the augmentation (e.g. different "displayed portions") are shown so that it appears that the user is looking through the border, as though it were a window. The amount by which the displayed portion is moved along the augmentation is hereinafter referred to as the "lateral shift" or "shift". The shift can have a both shift magnitude and a shift direction, as the displayed portion can be shifted in multiple directions. The shift can also be described by an x-component and y-component. The shift parallel to the relative x-displacement is hereinafter referred to as the "x-shift", and the shift parallel to the relative y-displacement is known as the "y-shift". From another perspective, the shift could be described as the movement of the total augmentation along the border (where the augmentation is then cropped such that only the portion of the augmentation that intersects with the border area is shown). Regardless of whether the shift is thought of as the displayed portion moving along the augmentation or the augmentation moving along the border, a shift results in a different augmented reality image seen by the user. Herein, the lateral shift will be in a direction opposite that of the device's movement. For example, if the device moves to the left, the displayed portion will move to the right of the augmentation, such that an area on the right side of the augmentation is shown.

The displayed portion is also affected when the device is moved nearer to or further away from the plane of the border, changing the z-distance. In this case, a larger area of the augmentation graphic is shown (e.g., the displayed portion increases in size) within the borders as the device is moved closer to the target object, and less is shown when the device is moved further away from the target object. Again, this creates the illusion that the user is looking through the border, as though it were a window, since a user will be able to see more of the outside world when closer to a window. The proportion of the augmentation that is shown (e.g., the size of the displayed portion) according to this rule is hereinafter referred to as the "bleed". The bleed typically has a value less than 1, and the bleed would have a value of 1 if the entire graphic was shown. In some embodiments, depending on the device's lateral displacement, a change in z-distance can also affect the lateral shift, as the relative lateral displacement can be changed by the z-distance.

Accordingly, the displayed portion can be defined by the shift and the bleed. The shift describes a location within the augmentation where the displayed portion is located, and the bleed describes a size of the displayed portion. A point on within the augmentation that is identified by a shift (e.g., a shift relative to the center of the augmentation) can be referred to as the "display position". In some embodiments, the shift describes the amount of movement of the displayed portion from the center of the augmentation, and the display position describes a point on the augmentation where the center of the displayed portion is located.

Using Euclidean geometry, unless the augmentation is infinite in extent, the user will see the edge of the augmentation as the lateral displacement increases in magnitude, or as the z-distance decreases. Because it is desirable to use augmentations that are finite in extent, embodiments solve the problem for inward motion (i.e., decreasing z-distance) by limiting the bleed so that it is never greater than unity (i.e., 1), such that the scaled augmentation is always wider and taller than the border (i.e., the displayed portion is always less than the entire augmentation).

Other embodiments can solve the problem for lateral displacement by limiting the lateral shift so that it is never greater in magnitude than the distance between the edge of the displayed portion and the edge of the augmentation—that is, however large the displayed portion, the displayed portion cannot be shifted so far that the edge of the augmentation can be seen within the displayed portion (e.g., the augmented image shown within the borders only includes the actual augmentation, and never shows the edge of the augmentation or any exterior blank space).

Every point in space has a well-defined z-distance and relative lateral displacement (relative x-displacement and relative y-displacement); therefore, these three numbers may be used as arguments to functions that determine the bleed and lateral shift of the augmentation. Moreover, the z-distance and relative lateral displacement are linearly independent—that is, one may be changed without changing the other. The relative lateral displacement can be changed without changing the z-distance by moving the device parallel to the border plane; the z-distance may be changed without changing the relative lateral displacement by moving the device radially—that is, along a line between the device and the center of the border. For this reason, it is possible to consider changes in these two measures independently, for parallel movement and for perpendicular movement.

III. Parallel Movement

In certain embodiments, for device movements parallel to the target object, the x-shift and y-shift of the displayed portion within the augmentation follow the behavior of a mathematical function of the relative x-displacement and relative y-displacement respectively. Both shifts are governed by the same function of their relative displacements. In certain embodiments, the function has the following properties:
1. the function is approximately linear when the relative lateral displacement is low;
2. the function is bounded above by a positive constant when the relative lateral displacement has a large positive value;
3. the function is bounded below by a negative constant when the relative lateral displacement has a large negative value;
4. the first and second order differentials of the function with respect to the relative lateral displacement are continuous; that is, the function has no sudden changes in value, and its gradient has no sudden changes in value, but both vary smoothly; and
5. the first order differential of the function (its gradient) is positive, with a single maximum value at the origin and tending to zero as the relative lateral displacement becomes large in magnitude; the function is therefore monotonic increasing.

In various embodiments, this can be defined as a continuously differentiable monotonic increasing function $f(x)$ parametrized by positive constants $k_0$ and $k_1$ that obey:
1. $f(0)=0$;
2. $f'(0)=k_0$;
3. $0 \le f'(x) \le k_0$;
4. $f(x) \to k_1$ as $x \to \infty$; and
5. $f(x) \to -k_1$ as $x \to \infty$ An advantage of shifting the displayed portion within the augmentation according to these guidelines is that the displayed portion shifts realistically, that is, according to the rules of Euclidean geometry, when the augmentation is most visible: when the relative lateral displacement is low, the border is viewed head-on (e.g. the device is positioned on or near a perpendicular line extending from the center of the border area), and that is where the shift approximates reality (i.e. the view seen by a user looking through a real window) most closely. Conversely, when the relative lateral displacement is high (e.g., the device is far from a perpendicular line extending from the center of the border area), the border is viewed at an extremely oblique angle and very little area within the border is visible on screen; the shift approximates reality less well, but this inferior approximation is not very noticeable because the visible area with the border is smaller.

Embodiments that follow these guidelines include, but are not limited to, the inverse tangent function ($\tan^{-1}(x)$ or arc $\tan(x)$) and the hyperbolic tan function ($\tan h(x)$). Whichever function is used, if z-distance is held constant, the x-shift should be proportional to the function of the relative x-displacement, and the y-shift should be proportional to the function of the relative y-displacement.

Figure 2:
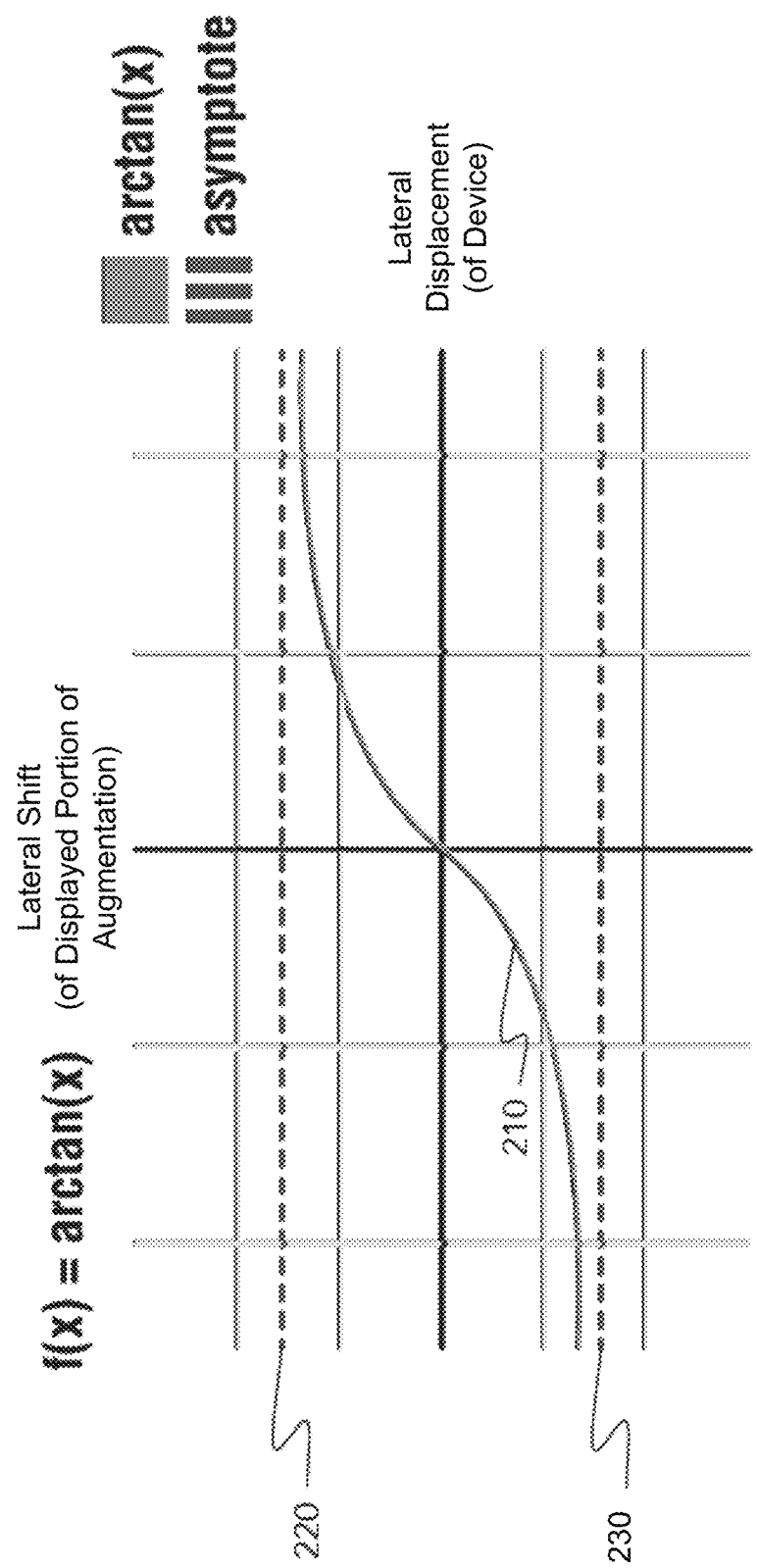
FIG. 2 is a diagram of a first mathematical function used for rendering graphics in response to device movement parallel to a target object according to embodiments of the present invention.

The inverse tangent function 210 is shown in FIG. 2. From the description above it can be seen that in an embodiment using the inverse tangent function, if z-distance is held constant, the x-shift on the texture map should be proportional to the inverse tangent of the relative x-displacement, and the y-shift proportional to the inverse tangent of the relative y-displacement.

In the graph, the x-axis corresponds to the lateral displacement—the actual physical movement of the device parallel to the plane of the border—and the y-axis corresponds to the amount by which the displayed portion is shifted along the augmentation (i.e. the lateral shift). The relative lateral displacement is zero when the user's device is perfectly head on to the border (i.e., the device is positioned along a perpendicular line extending from the center of the border); this is shown as the origin point of the graph. When the relative lateral displacement is zero, the shift is zero, meaning the center of the augmentation is shown. As the device moves, altering the lateral displacement on the x-axis, the shift varies according to the value of the y-axis, moving toward asymptotic absolute shift value 220 in one direction and asymptotic absolute shift value 230 in the other direction (indicated by the dotted lines in FIG. 2). These asymptotic limits 220 and 230 play the role of the positive and negative constants $k_1$ and $-k_1$ that bound the function, as described above. It can be seen that, as the device's lateral displacement increases to large values, causing a very oblique viewing angle, the lateral shift remains limited and never quite reaches the asymptotic limit. Thus, the edge of the displayed portion never reaches the edge of the augmentation, and therefore the viewer never sees the boundary of the augmentation.

In a real world setting where a person looks through a window, the outside world is not a limited augmentation image, and it is not typically limited by visible boundaries. The relationship between the viewer's lateral displacement and the lateral shift of what is seen of the infinite outside world is a linear relationship. Thus, using a function like the inverse tangent function 210 can both approximate the real world linear relationship well for head-on viewing angles (which are most commonly used), as well as prevent a viewer from seeing past the edge of the augmentation by sacrificing the real world approximation at oblique angles.

Figure 1:
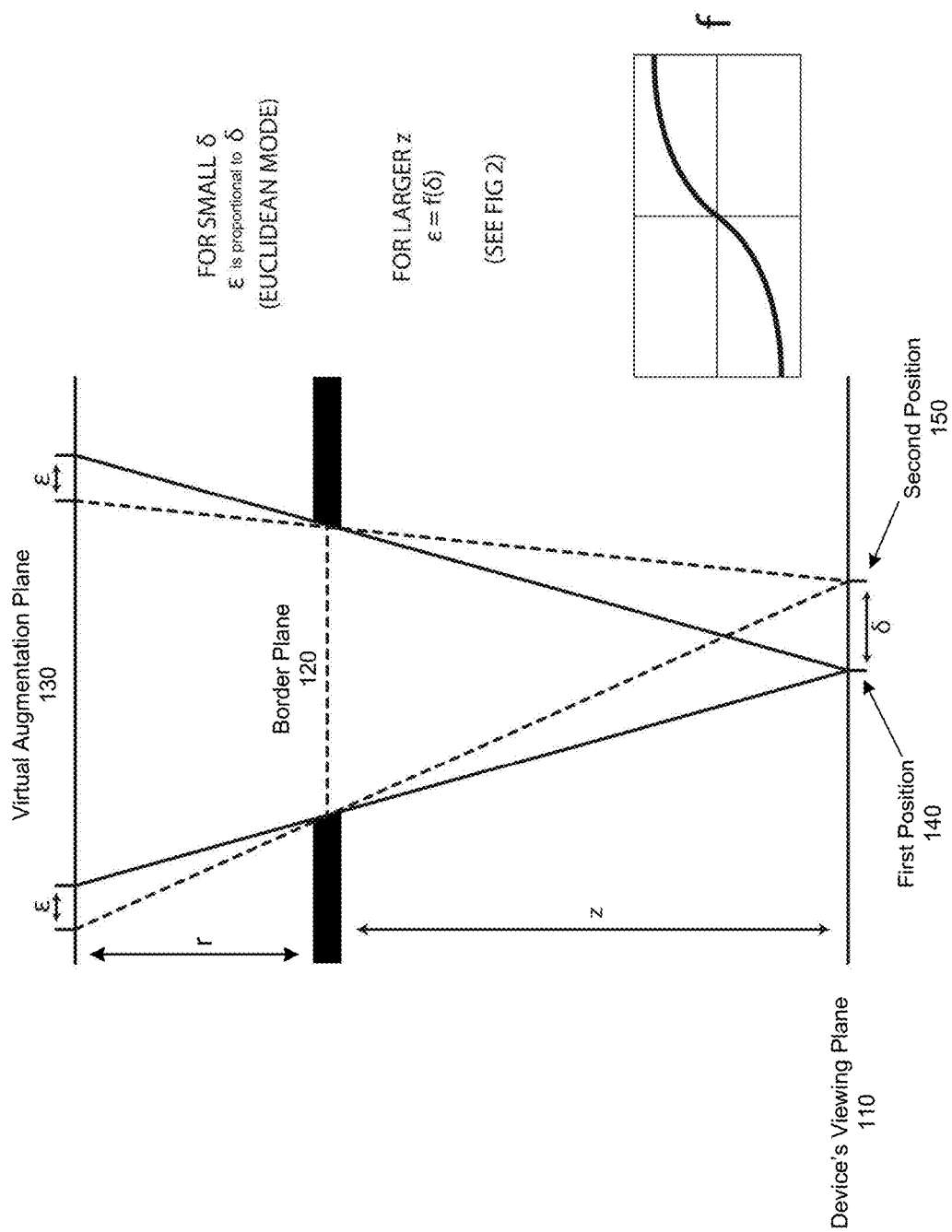
FIG. 1 is a schematic illustration of graphics rendering in response to device movement parallel to a target object according to embodiments of the present invention.

FIG. 1 shows a schematic illustration of the relationship between the position of the user's device, the target object, and the augmentation for an embodiment using the inverse tangent function to render graphics based on device movement parallel to a target object. The user's device is laterally displaced from a first position 140 to a second position 150, both positions being on the same device viewing plane 110. Thus, both the first position 140 and the second position 150 have the same z-distance from the border plane 120. The augmentation is located at a virtual augmentation plane 130 that is a virtual distance "r" behind the border plane 120. The displayed portion of the augmentation is the space between the viewing lines at each position. For example, the displayed portion corresponding the device's first position 140 is the space between the two solid lines on the virtual augmentation plane 130, and the displayed portion corresponding the device's second position 150 is the space between the two dotted lines on the virtual augmentation plane 130.

In addition to the position (e.g., lateral displacement and z-distance) of the user's device, the shift and bleed of the displayed portion can be affected by a number of other factors, including the size and shape of the border plane, the size and shape of the augmentation, and the virtual r-distance between the border plane 120 and the virtual augmentation plane 130. For example, if the border were narrower, the viewing lines would be constricted and the displayed portion would be smaller. Also, if the r-distance was lessened, the virtual augmentation plane 130 would be closer and the viewing lines would spread less before terminating at the augmentation. Thus, the displayed portion would again be smaller. Further, if the size of the augmentation was changed (e.g. the augmentation was stretched or compressed), the displayed portion would include more or less of the augmentation.

The first position 140 is a centered, head-on view of the border. This means the first position 140 has a lateral displacement of zero, and the corresponding first displayed portion has a shift of zero (meaning the center of the augmentation is shown). The second position 150 of the device has a rightward lateral displacement $\delta$, and it results in a leftward shift $\varepsilon$ for the displayed portion (both the left edge and right edge are shown as shifted by $\varepsilon$ in FIG. 1, meaning the entire displayed portion is shifted). If the lateral displacement is an x-displacement, the second position 150 has an x-coordinate of $\delta$ on the device's viewing plane 110, and the displayed portion has an x-coordinate of $-\varepsilon$ on the virtual augmentation plane 130 (which may be described as the coordinate of the center of the displayed portion).

In FIG. 1, the relationship between the relative lateral displacement coordinate $\delta$ and a shift coordinate $\varepsilon$ can be described as $\varepsilon \approx \tan^{-1}(\delta)$. The nature of the function means that, for small $\delta$, $\varepsilon$ is linearly proportional to $\delta$, giving realistic modifications according to Euclidean geometry as described above. But when $\delta$ gets bigger (the device moves further from the center), $\varepsilon$ increases less and less (instead of maintaining the a linear relationship between $\delta$ and $\varepsilon$, as would happen when looking through a window in the real world); the $\varepsilon$ curve flattens off to an asymptotic maximum value (as shown in FIG. 2), determined depending on the size of the augmentation and the virtual r-distance (i.e., how much leeway can be allowed so as to hide the edges of the augmented image from the user's view). Effectively, the relative lateral displacement of the user's device compared to the window is passed through the inverse tangent function (or another suitable function), and this is transformed into the lateral shift of the displayed portion of the augmented image. Since the displayed portion has a certain size, the leading edge of the displayed portion will be further shifted than the center of the displayed portion. Accordingly, if $\varepsilon$ is defined as the shift position of center of the displayed portion, $\varepsilon$ may have a lower limit than the distance from the augmentation center to the augmentation boundary (because if the center of the displayed portion is shifted nearly the entire distance to the augmentation boundary, the edge of the displayed portion may have crossed the augmentation boundary).

As mentioned, lateral displacement and shift can occur in both the x-direction and the y-direction. Accordingly, the direction and magnitude of the lateral displacement can be divided into x and y components, and then both the x-shift and y-shift can be determined as described above in order to determine the total shift. Thus, the total shift will have a shift magnitude and a shift direction that is a combination of an x-shift component and a y-shift component.

The exact relationship between $\delta$ and $\varepsilon$ may include additional terms, such as coefficients and/or constants. As mentioned above, these terms may depend on the r-distance, the size and shape of the border plane, the size and shape of the augmentation, and any other suitable factor. In some embodiments, additional information about the function can be gleaned by analyzing the real world relationship. For example, Euclidean geometry in FIG. 1 shows that the linear relationship between $\delta$ and $\varepsilon$ can be described as $\varepsilon = (r/z)\delta$. Some of the terms may carry over to the shift-limiting function described above. The exact function can also be affected by the coordinate system used (e.g., where the origin is defined), the method or API (e.g., OpenGL—which uses a normalized coordinate system, with coordinates being values between 0 and 1, for texture mapping to a plane) used for processing graphics and mapping textures on to a 3D object preparatory to rendering the object to a 2D image.

Acceptable error tolerance for the value of $\varepsilon$ produced by the function may depend on the device's display. For example, a shift error that is less than a pixel may be acceptable, as there may be no difference in the display. In some embodiments, an image rendering system (e.g., OpenGL) may be employed which uses involves single-precision floating point arithmetic (that is, arithmetic based on a 32-bit floating point system, including but not limited to systems such as those defined in IEEE 754-1985 and subsequently IEEE-754-2008, these examples using a single sign bit, eight exponent bits and 23 mantissa bits, allowing for an inferred mantissa precision of 24 bits), for which the error is typically around $6 \times 10^{-8}$ (under one part in ten million). Since most displays have less than 4000 pixels in the maximum dimension, this error of less than one part in ten million (i.e., far less than a pixel) may be considered an acceptable. A similar error tolerance can be used for bleed and perpendicular movement, which is discussed below.

IV. Perpendicular Movement

In certain embodiments, for device movements perpendicular to the plane of the target object, the bleed of the augmentation follows the behavior of a mathematical function of the device's z-distance from the plane of the target object. In some embodiments, the function has the following properties:

1. the function is approximately inverse linear when the z-distance is high;
2. the function is bounded above by a positive constant when the z-distance approaches zero;
3. the first and second order differentials of the function with respect to the relative lateral displacement are continuous; that is, the function has no sudden changes in value, and its gradient has no sudden changes in value, but both vary smoothly; and
4. the first order differential of the function (its gradient) is negative, with a single minimum value at or near the origin and tending to zero as the z-distance becomes large; the function is therefore monotonic decreasing.

In various embodiments, this can be defined as a continuously differentiable monotonic decreasing function $f(x)$ parameterized by positive constants $k_0$ and $k_1$ that obeys:

1. $f(0)=0$;
2. $f'(0)<0$;
3. $0 \leq f'(x) \leq k_1$;
4. $f(x) \to 0$ as $x \to \infty$; and
5. $f'(x) \to 0$ as $x \to \infty$ As the user's device approaches the target object, the bleed increases such that more and more of the augmented image is included in the displayed portion (similar to approaching a window, when more of the outside environment can be seen). According to Euclidean geometry, the amount of increase of the bleed should be proportional to the inverse of the z-distance. However, if the bleed is always proportional to the inverse of the z-distance, the bleed will eventually exceed the total size of the augmentation with small enough z-distance. To correct for this, in some embodiments, the increase in the bleed can be reduced as the z-distance becomes smaller, so that the user will not see the edges of the augmented image, and so that the parallax effect of the illusion will not be lost (when the border fills the entire screen, the surrounding context will not be visible and therefore the need for the parallax illusion will be diminished; until that time, it is desirable to have the shift and bleed of the displayed portion change relative to the border).

To accomplish these goals, a function may be used that is similar to an inverse linear curve for large argument values, but is limited as the z-distance becomes very small. Embodiments that follow these guidelines include, but are not limited to, the function $p(\tan^{-1}(z)/z)$, (illustrated in FIG. 4), where z is the z-distance and p is a tunable coefficient used to determine the exact curve. From the description above it can be seen that in an embodiment using the function $p(\tan^{-1}(z)/z)$, if relative lateral displacement is held constant, the bleed on the texture map should be proportional to the function $p(\tan^{-1}(z)/z)$.

Figure 4:
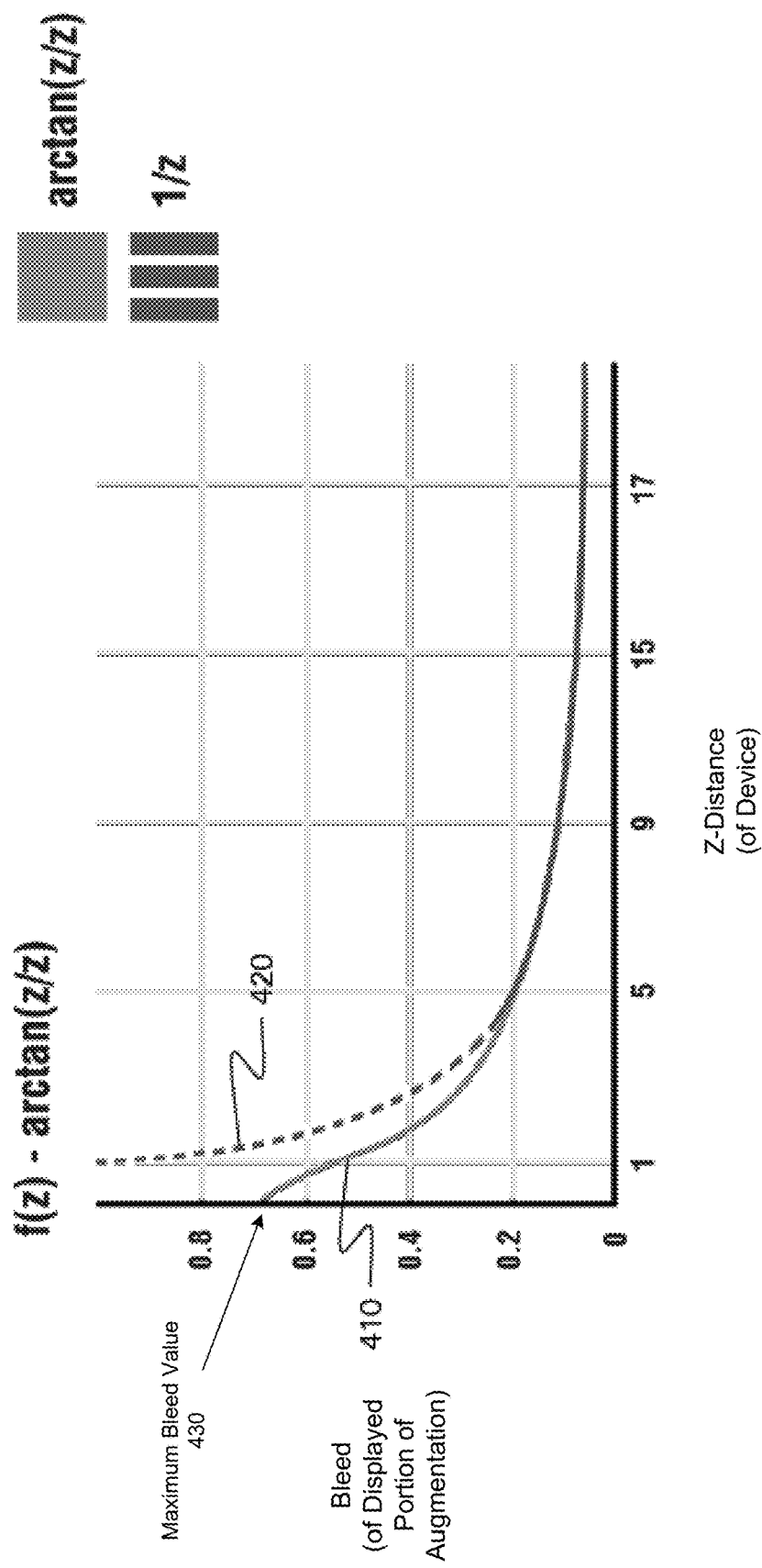
FIG. 4 is a diagram of a second mathematical function used for rendering graphics in response to device movement perpendicular to a target object according to embodiments of the present invention.

The function $p(\tan^{-1}(z)/z)$ 410 is shown in FIG. 4. In the graph, the x-axis corresponds to the z-distance—the actual physical movement of the device perpendicular to the plane of the border—and the y-axis corresponds to the amount of the augmentation that is included in the displayed portion (i.e. the bleed). As the device moves, altering the z-distance on the x-axis, the bleed varies according to the value of the y-axis, moving toward maximum bleed value 430 as z-distance approaches zero, and tending toward zero as z-distance tends to infinity. The maximum bleed value 430 plays the role of the positive constant $k_1$ that bounds the function, as described above. Accordingly, the function 410 looks similar to the geometrically correct (inverse linear) curve 420 for a large range of values, but is limited to a maximum bleed value 430 as the z-distance to the target object becomes very small, instead of allowing the bleed to run to infinity. Thus, the displayed portion never exceeds the entire augmentation, and the viewer never sees the edge of the augmentation.

In a real world setting where a person looks through a window, the outside world is not a limited augmentation image, and it is not typically limited by visible boundaries. The relationship between the viewer's z-distance and the amount of what is seen of the infinite outside world is an inverse linear relationship. Thus, using a function like the function $p(\tan^{-1}(z)/z)$ 410 can both approximate the real world inverse linear relationship well for z-distances that are not extremely close, as well as prevent a viewer from seeing past the edge of the augmentation by sacrificing the real world approximation at close z-distances (which is not a significant sacrifice because close z-distances may not be the typical scenario, and for close z-distances the border of the augmentation may be outside the edge of the device screen used to view the augmentation).

Figure 3:
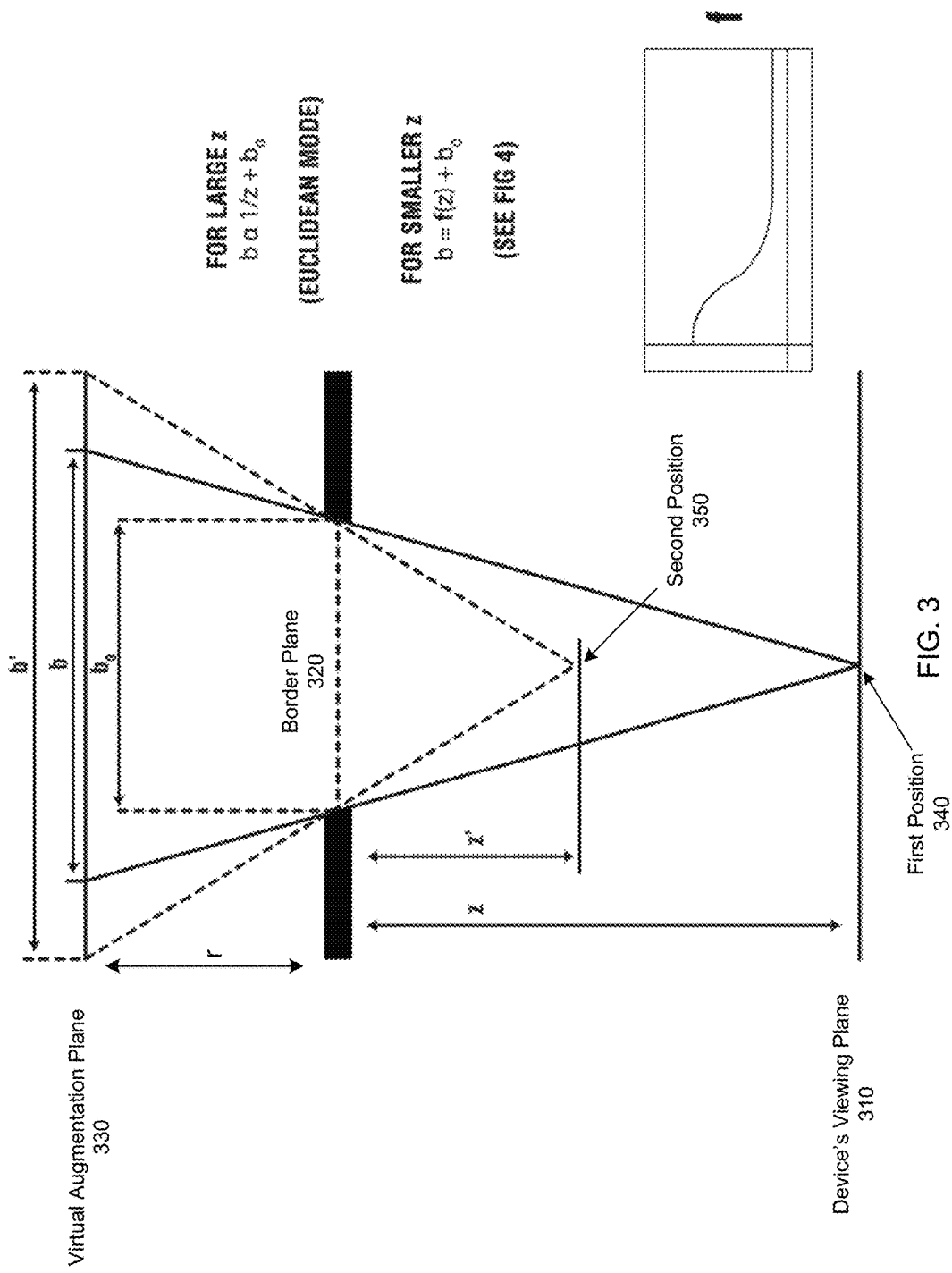
FIG. 3 is a schematic illustration of graphics rendering in response to device movement perpendicular to a target object according to embodiments of the present invention.

FIG. 3 shows a schematic illustration of the relationship between the position of user's device, the target object, and the augmentation for an embodiment using a function of the type described above, such as $p(\tan^{-1}(z)/z)$, to render graphics based on device movement perpendicular to a target object. The user's device is perpendicularly displaced from a first position 340 to a second position 350, both positions being on the same device viewing plane 110. Thus, both the first position 140 and the second position 150 having the same lateral distance from the center of the border plane 320 (lateral distance is zero in this example). The augmentation is located at a virtual augmentation plane 330 that is a virtual distance "r" behind the border plane 320. The displayed portion of the augmentation is the space between the viewing lines at each position. For example, the displayed portion corresponding the device's first position 340 is the space b between the two solid lines on the virtual augmentation plane 130, and the displayed portion corresponding the device's second position 350 is the space b' between the outer set of dotted lines on the virtual augmentation plane 330.

The first position 340 has a z-distance marked as z, while the second position 350 of the device has shorter z-distance marked as z'. It can be seen that decreasing the z-distance from z to z' results in an increase in bleed from b to b'. Also shown is the minimum bleed marked as $b_0$, which is associated with a very large z-distance. The minimum bleed $b_0$ is created by parallel viewing lines, which represent an infinite z-distance. Thus, in some embodiments, instead of shrinking to zero, the bleed may reduce to a minimum bleed $b_0$ as the z-distance tends to infinity.

In FIG. 3, the relationship between the z-distance coordinate the bleed can be described as $b \approx p(\tan^{-1}(z)/z)+b_0$. The nature of the function means that, for large z, b is inverse linearly proportional to z, giving realistic modifications according to Euclidean geometry as described above. But when z gets smaller and approaches zero (the device moves closer to the border), b increases less and less (instead of maintaining the inverse linear relationship between z and b, as would happen when looking through a window in the real world); the b curve flattens off to an asymptotic maximum value (as shown in FIG. 4), determined depending on the size of the augmentation and the virtual r-distance (i.e., how much leeway can be allowed so as to hide the edges of the augmented image from the user's view). Effectively, the z-distance of the user's device from the window is passed through the function $(\tan^{-1}(z)/z+b_0)$ (or another suitable function), and this is transformed into the bleed of the displayed portion of the augmented image.

Similarly to the function for shift, the exact relationship between b and z may be further specified with additional terms, such asp and other coefficients and/or constants. As mentioned above, these terms may depend on the r-distance, the size and shape of the border plane, the size and shape of the augmentation, and any other suitable factor. In some embodiments, additional information about the function can be gleaned by analyzing the real world relationship. For example, Euclidean geometry in FIG. 1 shows that the real world inverse linear relationship between b and z can be described as $b=(rb_0)/z+b_0$. Some of the terms may carry over to the bleed-limiting function described above. The exact function can also be affected by the coordinate system used (e.g., where the origin is defined), the method or API (e.g., OpenGL—which uses a normalized coordinate system, with coordinates being values between 0 and 1, for texture mapping to a plane) used for processing graphics and mapping textures on to a 3D object preparatory to rendering the object to a 2D image.

V. Interaction of Shift and Bleed

In some embodiments, the shift and bleed of the displayed portion may affect and/or limit each other. For example, when the bleed is small, there may be a large amount of augmentation area outside of the displayed portion. This means that a large amount of shift can happen before the displayed portion reaches the edge of the augmentation. Conversely, if the bleed is large, most of the augmentation may be included in the displayed portion, meaning that there may be very little augmentation area remaining outside of the displayed portion. As a result, only a small shift can take place before the displayed portion reaches the edge of the augmentation. Accordingly, when the z-distance is short and the bleed is large, the shift may be limited to small amounts, and when the z-distance is long and the bleed is small, larger shifts may be permitted. Thus, the shift function may be dependent upon and limited by the z-distance and/or bleed value.

Accordingly, in some embodiments, the z-distance and bleed may take priority. That is, for each device position, the bleed may first be determined based on the z-distance. Then, the shift may be limited to whatever amount of the augmentation remains outside the displayed portion (based on the bleed of the displayed portion). Thus, when calculating the shift based on the lateral displacement, the possible shift range (e.g., the maximum shift value) may be limited based on the bleed.

VI. Methods for Augmenting a Video Feed Based on Lateral Displacement

Figure 6:
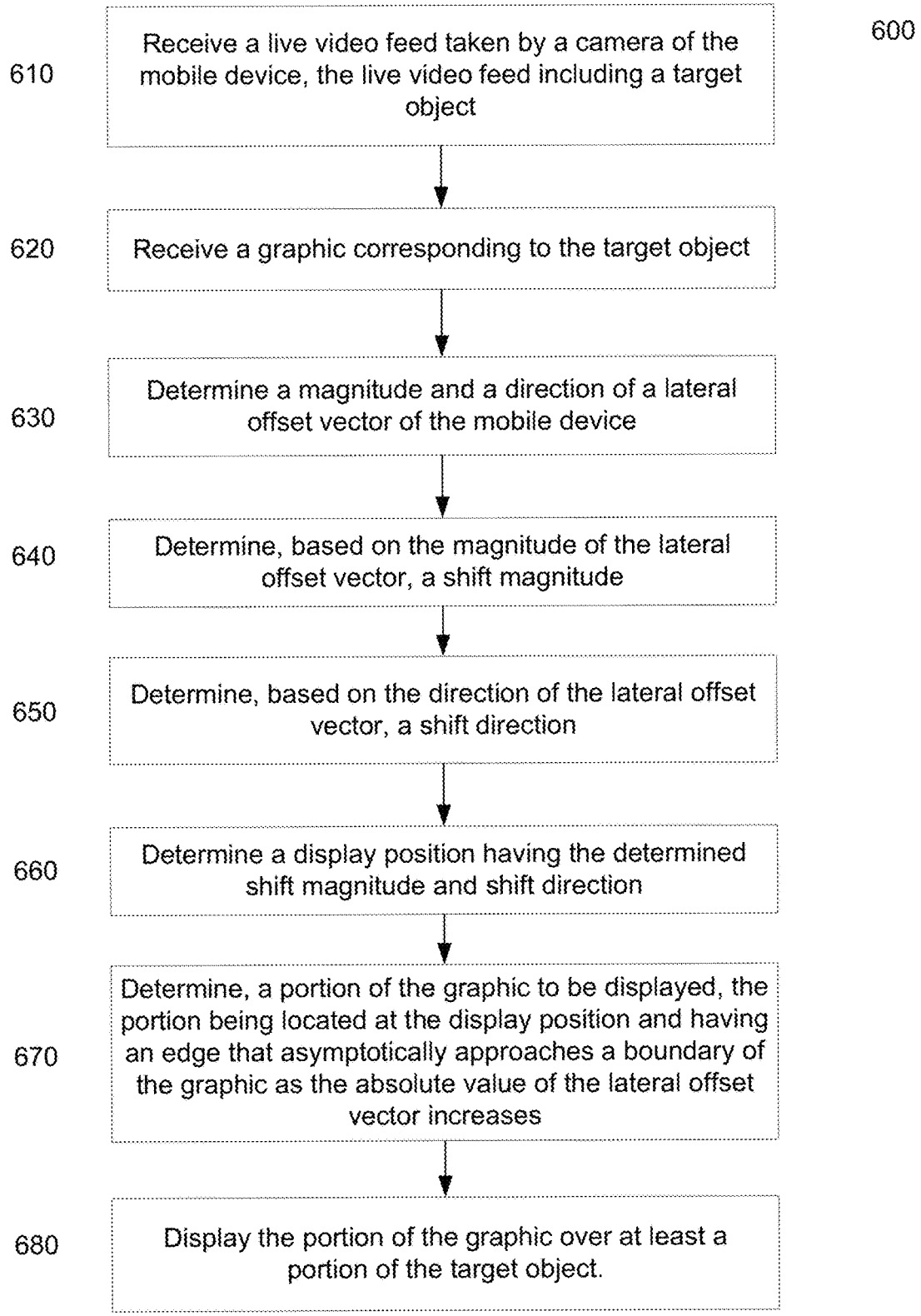
FIG. 6 is a flowchart illustrating a method 600 for augmenting a video feed displayed on a mobile device based on lateral displacement according to embodiments of the present invention.

FIG. 6 is a flowchart illustrating a method 600 for augmenting a video feed displayed on a mobile device based on lateral displacement according to embodiments of the present invention.

In block 610, the mobile device may receive a live video feed taken by a camera that is communicably coupled to at least one processor of the mobile device. The live video feed may include a target object. For example, the user may operate a camera of the mobile device and direct the camera toward the target object.

In block 620, the mobile device may receive a graphic (i.e., an augmentation) corresponding to the target object. The graphic may have a defined size, shape, content, and boundaries. For example, in some embodiments, the mobile device may communicate with a server containing a database of target object and associated graphics, and the server may provide the graphic in response to the mobile device detecting the target object. Alternatively, the mobile device may itself store a set of target objects and associated graphics, which may have been received in bulk from the server at an earlier time, and the mobile device may itself identify the graphic that corresponds to the target object. In order to correctly identify the target object, the mobile device may locate key points and adjust for alignment, as described above.

In block 630, the mobile device may determine a position of the mobile device relative to the target object. For example, as described above, the mobile device may be able to determine the position of the target object within the live video feed, and then translate the coordinate system to obtain the position of the mobile device relative to the target object. The mobile device position may include two components; a lateral offset vector component (measuring movement parallel to the plane of the target object) and a z-distance component (measuring movement perpendicular to the plane of the target object). This flow will focus on the lateral offset vector. Accordingly, determining a position of the mobile device relative to the target object can include determining a magnitude and a direction of a lateral offset vector of the mobile device, the lateral offset vector being a measurement of the distance from the center of the target object to the mobile device in a direction parallel to the plane of the target object. The lateral offset vector may be in any direction within a plane parallel to the target object.

In block 640, the mobile device may determine a shift magnitude based on the magnitude of the lateral offset vector. For example, the shift magnitude may be dependent on the lateral offset vector, and may increase as the lateral offset vector increases, as described above. The shift magnitude may be a combination of two perpendicular component shift magnitudes (e.g., an x-shift magnitude and a y-shift magnitude).

In block 650, the mobile device may determine a shift direction based on the direction of the lateral offset vector. In some embodiments, the lateral offset vector can be described by an x-displacement and a y-displacement, such that determining a shift direction may include determining an x-shift and y-shift. In some embodiments, the shift direction may be opposite the direction of the lateral offset vector.

In block 660, the mobile device may determine a display position, which may be a point on the graphic that is separated from a center point on the graphic by the shift magnitude in the shift direction.

The display position may asymptotically increase to a first positive maximum for lateral offset vectors in a first direction, and the display position may asymptotically decrease to a second negative minimum for lateral offset vectors in a second direction that is opposite the first direction. For example, the first positive maximum may be a display position in the +x direction that is at or near a +x boundary of the graphic. The display position may tend toward this value as the lateral offset vector decreases toward negative infinity the −x direction. The second negative minimum may be a display position in the −x direction that is at or near a −x boundary of the graphic. The display position may tend toward this value the lateral offset vector increases toward infinity the +x direction.

In some embodiments, a first function may be used to determine the display position, and the lateral offset vector may be an input of the first function. The first function may approximate a linear function when the lateral offset vector is near zero, and the output display position may vary less as the lateral offset vector increases or decreases away from zero (as the display position approaches an asymptotic limit in each direction). Examples of appropriate functions may include arc $\tan(x)$ and $\tan h(x)$, where x is the lateral offset vector.

In block 670, the mobile device may determine a portion of the graphic to be displayed. This displayed portion may be located (e.g., centered) at the display position. As described above, the display position may be limited to stay within the boundaries of the graphic, regardless of how much the lateral offset vector increases or decreases. Accordingly, the displayed portion may be similarly limited. For example, the displayed portion may have an edge that asymptotically approaches a boundary of the graphic as the absolute value of the lateral offset vector increases. When the lateral offset vector is zero, the displayed portion may include a center region of the graphic.

The displayed portion may also have a certain size (e.g., it may include a certain amount of the graphic). Determination of the size, which may depend on the z-distance, is described below with respect to FIG. 7.

In block 680, the mobile device may display the portion of the graphic over at least a portion of the target object. Thus, the mobile device may provide an augmented reality display where the displayed portion of the graphic is shown within the live video feed. The displayed portion may change so that different areas of the graphic are shown as the position of the mobile device changes, such that the display emulates the experience of looking through a window.

Figure 7:
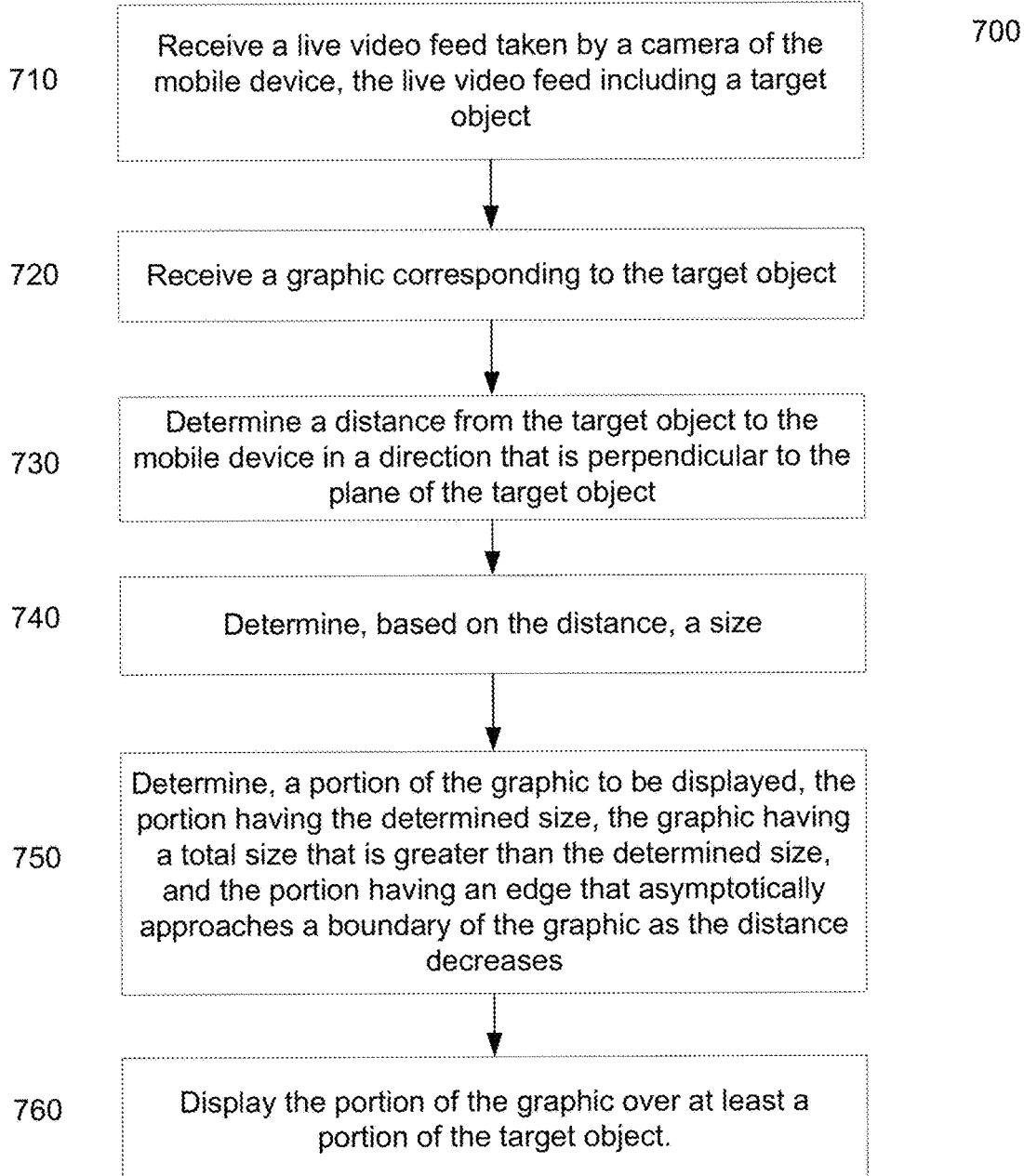
FIG. 7 is a flowchart illustrating a method 700 for augmenting a video feed displayed on a mobile device based on perpendicular displacement according to embodiments of the present invention.

VII. Methods for Augmenting a Video Feed Based on Perpendicular Displacement FIG. 7 is a flowchart illustrating a method 700 for augmenting a video feed displayed on a mobile device based on perpendicular displacement according to embodiments of the present invention. While the method 700 is similar to method 600, instead of measuring lateral offset distance and determining the display position or the displayed portion, the method 700 measures z-distance and determines the size of the displayed portion. These methods may typically be performed together such that both the size and display position can be determined.

In block 710, the mobile device may receive a live video feed taken by a camera that is communicably coupled to at least one processor of the mobile device. The live video feed may include a target object. For example, the user may operate a camera of the mobile device and direct the camera toward the target object.

In block 720, the mobile device may receive a graphic (i.e., an augmentation) corresponding to the target object. The graphic may have a defined size, shape, content, and boundaries. For example, in some embodiments, the mobile device may communicate with a server containing a database of target object and associated graphics, and the server may provide the graphic in response to the mobile device detecting the target object. Alternatively, the mobile device may itself store a set of target objects and associated graphics, which may have been received in bulk from the server at an earlier time, and the mobile device may itself identify the graphic that corresponds to the target object. In order to correctly identify the target object, the mobile device may locate key points and adjust for alignment, as described above.

In block 730, the mobile device may determine a position of the mobile device relative to the target object. For example, as described above, the mobile device may be able to determine the position of the target object within the live video feed, and then translate the coordinate system to obtain the position of the mobile device relative to the target object. The mobile device position may include two components; a lateral offset vector component (measuring movement parallel to the plane of the target object) and a z-distance component (measuring movement perpendicular to the plane of the target object). This flow will focus on the z-distance. Accordingly, determining a position of the mobile device relative to the target object can include determining a distance from the target object to the mobile device in a direction that is perpendicular to the plane of the target object (i.e., determining z-distance).

In block 740, the mobile device may determine a size (i.e., bleed) based on the determined z-distance. The size and z-distance may be related in that the size may asymptotically increase to a third positive maximum as the z-distance decreases. The third positive maximum may be the total size of the graphic, and the size may become close to this amount as the z-distance approaches zero (meaning the mobile device approaches the location of the target object).

In some embodiments, a second function may be used to determine the size, and the z-distance may be an input of the second function. The output of the function may decrease in an inverse linear manner while the z-distance increases. Examples of appropriate functions may include arc tan(z)/z, where z is the z-distance.

In block 750, the mobile device may determine a portion of the graphic to be displayed. This displayed portion may be have the determined size. As described above, the size may be always be smaller than the total size of the graphic, regardless of how much the z-distance decreases. Accordingly, the displayed portion may always be a subsection of the graphic, and may never include blank space outside the boundaries of the graphic. For example, the displayed portion may have an edge that asymptotically approaches a boundary of the graphic as the z-distance decreases.

As described above with respect to FIG. 6, the displayed portion may be located at a certain display position. In some embodiments, the display position may be limited by the size. For example, when the size is large and approaches the total size of the graphic, only a small shift may be allowed, such that the displayed portion stays within the boundaries of the graphic. Accordingly, the size may be determined first, and the display position may be determined second within the limits of the remaining graphic space.

In block 760, the mobile device may display the portion of the graphic over at least a portion of the target object. Thus, the mobile device may provide an augmented reality display where the displayed portion of the graphic is shown within the live video feed. The displayed portion may change so that different areas of the graphic are shown as the position of the mobile device changes, such that the display emulates the experience of looking through a window.

VIII. Computer System

Figure 8:
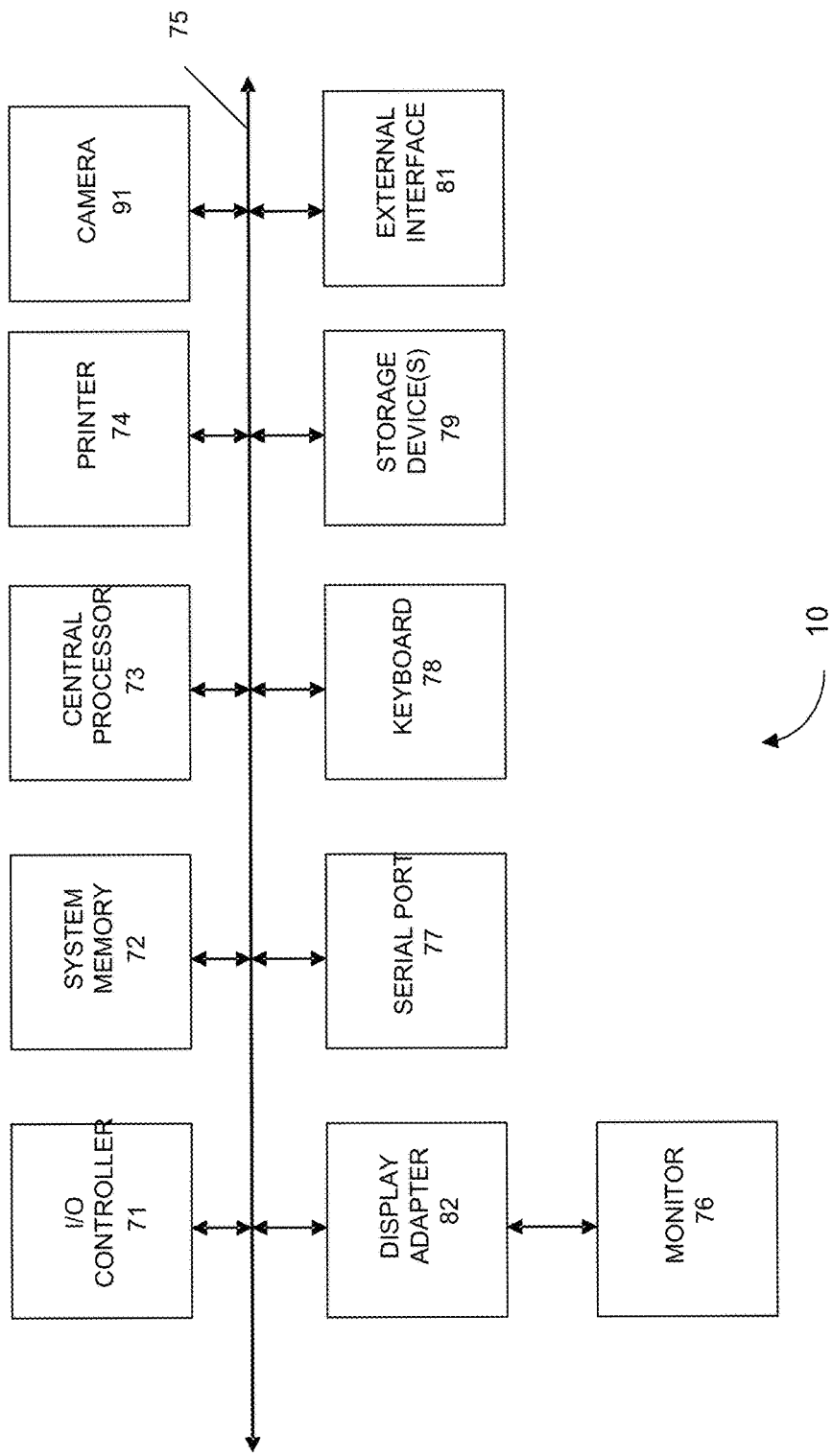
FIG. 8 shows a block diagram of an example computer system 10 usable with system and methods according to embodiments of the present invention.

Any of the computer systems mentioned herein may utilize any suitable number of subsystems. Examples of such subsystems are shown in FIG. 8 in computer apparatus 10. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 8 are interconnected via a system bus 75. Additional subsystems such as a camera 91, printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 977 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, OpenGL, or scripting language such as Perl or Python using, for example, conventional or object-oriented techniques or other suitable programming techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned here are incorporated by reference in their entirety for all purposes. None is admitted to be prior art.

What is claimed is:

1. A method for augmenting a video feed displayed on a mobile device comprising one or more processors, the method comprising performing by the mobile device:
   receiving a live video feed taken by a camera that is communicably coupled to at least one processor of the mobile device, the live video feed including a target object;
   receiving a graphic corresponding to the target object, the graphic having boundaries;
   determining a magnitude and a direction of a lateral offset vector of the mobile device, the lateral offset vector being a measurement of the distance from the center of the target object to the mobile device in a direction parallel to the plane of the target object;
   determining, based on the magnitude of the lateral offset vector, a shift magnitude;
   determining, based on the direction of the lateral offset vector, a shift direction, wherein the shift direction is opposite the direction of the lateral offset vector;
   determining a display position, wherein the display position is a position on the graphic, and wherein the display position is separated from a center point on the graphic by the shift magnitude in the shift direction;
   determining a portion of the graphic to be displayed, wherein the portion is located at the display position, wherein the portion has an edge that asymptotically approaches a boundary of the graphic as the absolute value of the lateral offset vector increases; and
   displaying the portion of the graphic over at least a portion of the target object.

2. The method of claim 1, wherein the display position is determined by an output of a first function, and wherein the lateral offset vector is an input of the first function.

3. The method of claim 2, wherein the output is zero for an input lateral offset vector of zero, wherein the output asymptotically increases to a first positive maximum for input lateral offset vectors in a first direction, and wherein the output asymptotically decreases to a second negative minimum for input lateral offset vectors in a second direction, the second direction being opposite to the first direction.

4. The method of claim 3, wherein the first positive maximum corresponds to a first edge of the graphic, and wherein the second negative minimum corresponds to a second edge of the graphic.

5. The method of claim 4, wherein the relationship between the output display position and the input lateral offset vector approximates a linear relationship when the lateral offset vector is near zero, and wherein output display position varies less as the lateral offset vector increases or decreases away from zero.

6. The method of claim 5, wherein the first function includes at least one of arctan(x) and tan h(x), where x is the lateral offset vector.

7. The method of claim 5, further comprising:
determining a distance from the target object to the mobile device in a direction that is perpendicular to the plane of the target object; and
determining, based on the distance, a size,
wherein the determined portion of the graphic has the determined size, wherein the graphic has a total size that is greater than the determined size, and wherein the portion has an edge that asymptotically approaches a boundary of the graphic as the distance decreases.

8. A method for augmenting a video feed displayed on a mobile device comprising one or more processors, the method comprising performing by the mobile device:
receiving a live video feed taken by a camera that is communicably coupled to at least one processor of the mobile device, the live video feed including a target object;
receiving a graphic corresponding to the target object, the graphic having boundaries;
determining a distance from the target object to the mobile device in a direction that is perpendicular to the plane of the target object;
determining, based on the distance, a size;
determining a portion of the graphic to be displayed, wherein the portion of the graphic has the determined size, wherein the graphic has a total size that is greater than the determined size, and wherein the portion has an edge that asymptotically approaches a boundary of the graphic as the distance decreases; and
displaying the portion of the graphic over at least a portion of the target object.

9. The method of claim 8, wherein the size of the portion increases to a third positive maximum as the distance decreases.

10. The method of claim 9, wherein the third positive maximum is a total size of the graphic.

11. The method of claim 10, wherein the size is determined by an output of a second function, and wherein the distance is an input of the second function.

12. The method of claim 11, wherein the output decreases in an inverse linear manner.

13. The method of claim 12, wherein the function is arctan(z)/z, where z is the distance.

14. The method of claim 12, further comprising:
determining a magnitude and a direction of a lateral offset vector of the mobile device, the lateral offset vector being a measurement of the distance from the center of the target object to the mobile device in a direction parallel to the plane of the target object;
determining, based on the magnitude of the lateral offset vector, a shift magnitude;
determining, based on the direction of the lateral offset vector, a shift direction, wherein the shift direction is opposite the direction of the lateral offset vector; and
determining a display position, wherein the display position is a position on the graphic, and wherein the display position is separated from a center point on the graphic by the shift magnitude in the shift direction,
wherein the determined portion of the graphic is located at the display position, and wherein the portion has an edge that asymptotically approaches a boundary of the graphic as the absolute value of the lateral offset vector increases.

15. The method of claim 14, wherein a range of possible display position values is limited based on the determined size.

16. A computer product comprising a non-transitory computer readable medium storing a plurality of instructions that when executed control a mobile device comprising one or more processors to augmenting a video feed displayed on the mobile device, the instructions comprising:
receiving a live video feed taken by a camera that is communicably coupled to at least one processor of the mobile device, the live video feed including a target object;
receiving a graphic corresponding to the target object, the graphic having boundaries;
determining a magnitude and a direction of a lateral offset vector of the mobile device, the lateral offset vector being a measurement of the distance from the center of the target object to the mobile device in a direction parallel to the plane of the target object;
determining, based on the magnitude of the lateral offset vector, a shift magnitude;
determining, based on the direction of the lateral offset vector, a shift direction, wherein the shift direction is opposite the direction of the lateral offset vector;
determining a display position, wherein the display position is a position on the graphic, and wherein the display position is separated from a center point on the graphic by the shift magnitude in the shift direction;
determining a portion of the graphic to be displayed, wherein the portion is located at the display position, wherein the portion has an edge that asymptotically approaches a boundary of the graphic as the absolute value of the lateral offset vector increases; and
displaying the portion of the graphic over at least a portion of the target object.

17. The computer product of claim 16, wherein the computer product is the mobile device.

18. The computer product of claim 17, wherein the mobile device includes the camera.

19. The computer product of claim 18, wherein the display position is determined by an output of a first function, and wherein the lateral offset vector is an input of the first function.

20. The computer product of claim 19, wherein the output is zero for an input lateral offset vector of zero, wherein the output asymptotically increases to a first positive maximum for input lateral offset vectors in a first direction, and wherein the output asymptotically decreases to a second negative minimum for input lateral offset vectors in a second direction, the second direction being opposite to the first direction.

* * * * *